Oct. 23, 1956  J. W. ANDERSON  2,767,734
FLUID CONTROL VALVE
Filed June 3, 1952  3 Sheets-Sheet 1
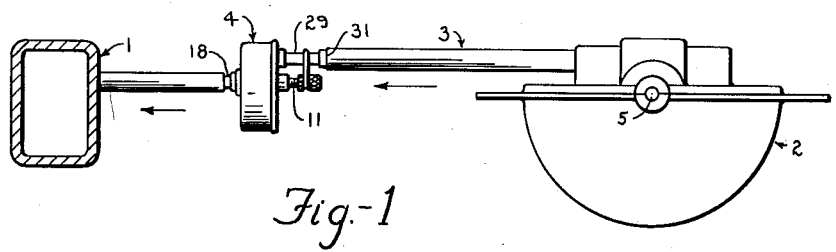
Fig.-1
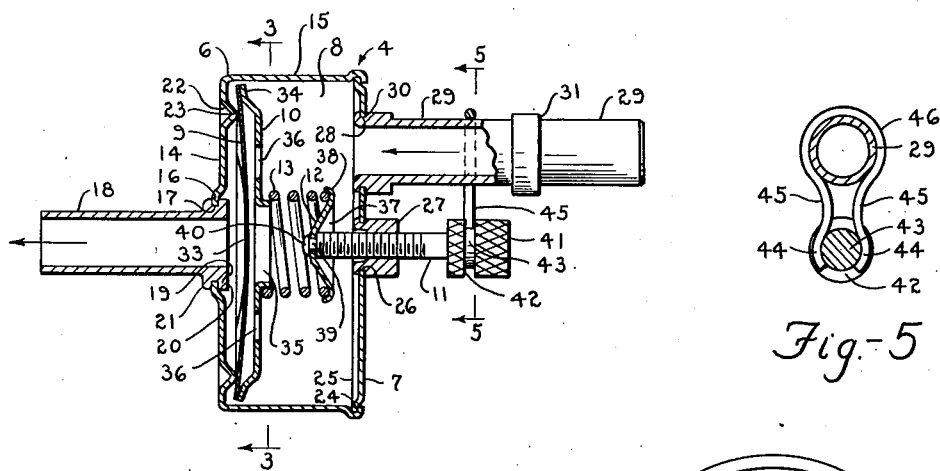
Fig.-2
Fig.-5
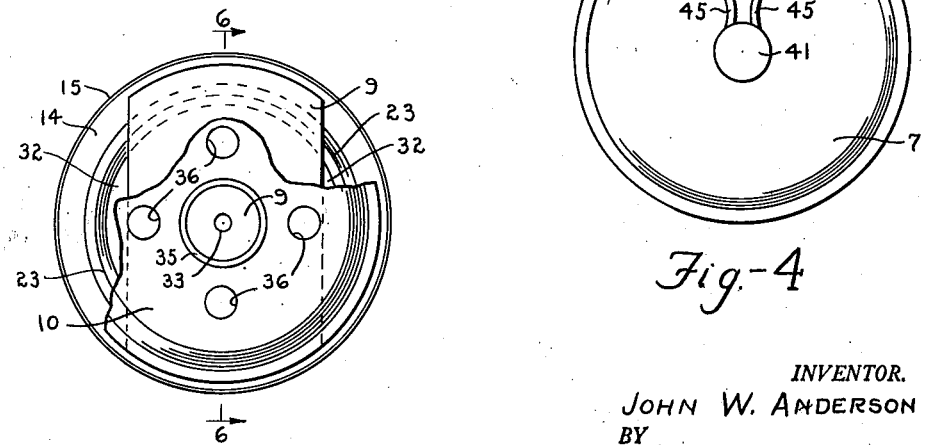
Fig.-3
Fig.-4
INVENTOR.
JOHN W. ANDERSON
BY
Charles S. Penfold
ATTORNEY Oct. 23, 1956 J. W. ANDERSON 2,767,734
FLUID CONTROL VALVE
Filed June 3, 1952 3 Sheets-Sheet 2

INVENTOR.
JOHN W. ANDERSON
BY
Charles S. Penfold
ATTORNEY

Oct. 23, 1956  J. W. ANDERSON  2,767,734
FLUID CONTROL VALVE

Filed June 3, 1952  3 Sheets-Sheet 3

INVENTOR.
JOHN W. ANDERSON
BY
Charles S. Penfold
ATTORNEY

United States Patent Office 2,767,734
Patented Oct. 23, 1956

2,767,734

FLUID CONTROL VALVE

John W. Anderson, Gary, Ind., assignor to Productive Inventions, Inc., a corporation of Indiana Application June 3, 1952, Serial No. 291,479

13 Claims. (Cl. 137—498)

This invention relates generally to fluid control means and more particularly is directed to a valve device for regulating the flow of fluid in a line or conduit of a fluid operated system.

A broad object of this invention is to provide method and valve means by which work to be performed by fluid pressure can be held automatically within desirable limits with relation to actual power employed, automatic compensation being provided for irregularities in the intensity of power at the source.

A further purpose is to provide method and valve means by which variations in the flow of a fluid through a conduit may be minimized regardless of the source-pressure inducing the flow.

A particular object of the invention is to provide automatic method and means by which undesirable variations in the speed of operation of a fluid-type windshield wiper motor may be minimized.

While it will be obvious that the method and means employed has many uses not related to windshield wipers, there is here presented a device by which the invention may be practiced successfully in relation to automatic windshield wipers of the fluid type—particularly the vacuum type.

Every observant driver of any one of the approximately forty million motor vehicles now in use, and equipped with vacuum windshield wiper motors, is annoyed and endangered in traffic in stormy weather by two performance characteristics of his vacuum windshield wiper motor—two characteristics common to all vacuum windshield wiper motors.

In ordinary driving the vacuum value varies from substantially less than eight inches of mercury to substantially more than twenty inches. When the foot is removed abruptly from the accelerator, with the motor running at normal cruising speeds, the vacuum shoots up to abnormally high values. Whenever the accelerator is depressed suddenly, the vacuum drops to abnormally low values.

Each vacuum motor is provided with a hand throttle for manual operation. The driver may adjust the throttle to restrict the intake of the wiper motor sufficiently to prevent abnormal racing of the motor at abnormally high vacuum values. However, if he does so, upon depressing his accelerator (to open the throttle of the automobile engine) as the vacuum value drops the wiper motor, with its intake arbitrarily restricted, tends to slow down abnormally for want of adequate access of air, and, at a point of vacuum determined by motor loading, including internal friction, the motor stalls.

Thus the driver must choose between two evil performance characteristics, one of which confuses and annoys and the other of which reduces the speed and effectiveness of his windshield wiping apparatus, often during the most critical and dangerous conditions encountered in driving.

As a partial remedy for the tendency of the wiper motor to slow down, various types of auxiliary-booster methods and mechanisms have been presented, but their cost to the car owner has been such as to have restricted their use. No such booster apparatus affords any relief from the racing of the vacuum wiper motor occasioned by high vacuum.

This racing is undesirable, not only from the standpoint of its annoyance to the driver. Racing of the wiper motor subjects the motor and the wiper arm and the blade to excessive shock and strain as the wiper stroke is reversed. This excessive strain tends to cause distortions and breakdowns of connections between members. Racing also tends to force the wiper blade and arm to overreach at the end of the stroke and to slap the windshield frame. This slapping is annoying to the driver and is destructive to wiper mechanisms, as well as to car finish.

Much of the trend toward electric wiper motors, which usually are substantially more costly than vacuum wiper motors in the same power category, has been due to the above-discussed performance deficiencies and irregularities common to all vacuum motors.

Electric wiper motors not only are more costly than vacuum motors, but they require substantial quantities of copper in their production. Shortages of copper are particularly acute in periods of high production for military uses. When electric wiper motors are used it adds to the total load of the electrical apparatus of the automobile, and provision must be made for carrying that load. Such expansion of magneto and battery capacities also adds to the cost of the vehicle.

The above-discussed deficiencies of the vacuum-type windshield wiper motor have been well impressed upon all car manufacturers, car resellers, and car owners, since the advent of the vacuum wiper more than thirty years ago. Many efforts have been made to eliminate these undesirable characteristics—without eliminating the vacuum motor. Vacuum motor manufacturers, as well as car manufacturers, engineers, and all manner of "crossroads" mechanics have endeavored to determine upon a satisfactory solution of the problem. Prior to the subject invention, none had been discovered.

It of course has been desirable to permit the operation of vacuum wiper motors with wide-open throttles, as a means of minimizing the drop in speed while approaching the point at which the wiper motor stalls under low vacuum. It has been desirable that this unrestricted flow through the vacuum motor to the engine intake be maintained up to the point where there occurs an increase in vacuum values sufficient to cause the motor to race undesirably.

One problem has been to maintain such unobstructed flow to the point where racing would begin and then introduce a control to produce thereafter substantially a "straight line" performance (as to the speed of the wiper motor) throughout the entire range of excess vacuum values.

Accordingly, one important object of the invention is to provide a valve device, embodying improved principles of design and construction, which overcomes all of the disadvantages inherent in prior devices attempting to solve the problem above referred to.

A significant object of the invention is to provide a valve device with a novel valve or control element and a manual adjustment thereof so that the volume of fluid passing through the device can be predetermined or regulated.

Another object of the invention is to provide a valve device which is comparatively small in size and relatively light in weight so that it can be readily interposed in a conduit or line for sole support thereby.

A particular object of the invention is to provide a unique valve device in which a single manual operable member serves to simultaneously place a pair of valve components in different operative positions to jointly control the flow of fluid through the device.

A specific object of the invention is to provide a novel valve device whereby a pair of valve components, one movable in the other, jointly function to control the flow of fluid through the device.

Another object of the invention is to provide a compact valve device composed of a minimum number of components or members which can be economically manufactured and readily assembled on a production basis.

A further object of the invention is to provide a valve device which is durable, efficient and particularly sensitive to small variations in pressure.

Other objects and advantages of the invention will become apparent after the description hereinafter set forth is considered in conjunction with the drawings annexed hereto.

In the drawing wherein the parts or members are designated by the same numerals:

Figures 1 through 7 of the drawing illustrate one form or embodiment of the invention and Figures 9 and 10 illustrate a second form of the invention.

Figure 1 is a side view in elevation exemplifying the valve device interposed and supported in a line or conduit communicatively connecting a source of vacuum supply with a windshield wiper motor;

Figure 2 is an enlarged longitudinal section taken through the device illustrating details of its construction, including a manual adjustment for the control or valve element;

Figure 3 is a transverse section taken substantially on line 3—3 of Figure 2, with a portion of one of the members broken away to illustrate additional details;

Figure 4 is one end view of the device;

Figure 5 is a transverse section taken substantially on line 5—5 of Figure 2 depicting means employed for locking in place the manual adjustment for the control or valve element, said means also being shown in Figures 1, 2 and 4;

Figure 6:
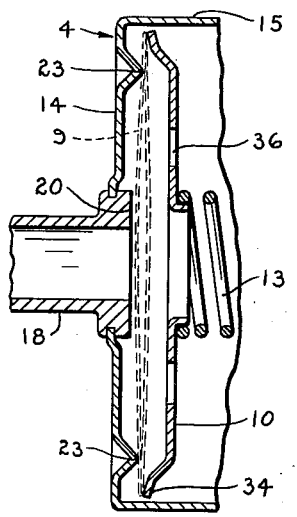
Figure 6 is an enlarged partial sectional view of the device taken substantially on line 6—6 of Figure 3.

This application is a continuation-in-part of my pending application entitled Fluid Control Valve, filed December 20, 1951 and bearing Serial Number 263,251.

The disclosure exemplified in Figures 1 through 8 will be described first. Numeral 1 denotes a conventional source of vacuum, 2 a windshield wiper motor communicatively connected to the source by a conduit, hose, or line 3, and 4 is the valve device embodying the structure of the invention interposed in the line 3 for accomplishing the objects above set forth.

The motor 2 may be of the conventional type having, among other things, an oscillatable vane which is operated by fluid pressure to actuate a drive shaft 5. A wiper arm and blade assembly is adapted to be carried by the shaft.

The valve device includes a cup member 6 and a round cover 7 which are secured together to provide a housing forming a cylindrical chamber 8. Within the chamber there is arranged a mechanism comprising a valve element or control member 9, a pressure member 10, a manual adjustment in the form of a screw 11, a retainer 12 carried by the screw, and a helical spring 13 interposed between the pressure member and retainer for forcing the pressure member and valve element in one direction and the retainer in an opposite direction, all of which will be described in detail subsequently.

More particularly, the cup 6 includes a radial base wall 14 and an axially extending round side wall 15. The base wall 14 is provided with a centrally disposed depression 16 having an opening 17 therein. A cylindrical tubular extension 18 is permanently connected to the base wall. The inner end of the extension is provided with a radial flange 19 having a flat bearing surface forming a valve seat 20. The extension is preferably connected to the base wall by inserting the extension through the opening 17 so that the flange 19 is seated in the depression 16 and then upsetting a shoulder 21 on the extension against the exterior surface of the depression to form a fluid tight joint between the extension and wall. The arrangement is preferably such that the bearing surface or seat 20 is disposed inwardly from and in parallel relation to the inner surface of the base wall. The base wall is further provided with an inwardly extending annular fulcrum or pivot 22 concentrically arranged with respect to the side wall 15 of the housing and the depression 11. It will be noted that the fulcrum is preferably formed by depressing the base wall to form a corrugation substantially V-shaped in cross-section to provide a rest 23, which is located closer to the side wall 15 than to the periphery of the flange 19. It should be noted that the corrugation also serves to reinforce or lend stability to the base wall so as to prevent any possibility of distortion or flexation of the wall when the valve device is in operation.

As will be pointed out more in detail hereinafter, the outer end of the extension 18 is adapted to be received and secured within one end of a section of the conduit 3.

The cover is preferably made flat and provided with a peripheral offset flange 24. This cover may be secured to the housing in any manner desired but is preferably permanently secured thereto by placing the flange 24 against a radial shoulder 25 formed on the side wall 15 of the cup and then upsetting the marginal edge portion of the wall against the flange 24 to provide a fluid tight joint between the cover and cup.

The cover is also provided with a central aperture 26 within which a bearing 27 is secured. The cover is further provided with an opening 28 located between the aperture 26 and the flange 24. A cylindrical tubular extension 29, similar to extension 18, is preferably secured in the opening 28 by upsetting the inner end of the extension against the inner surface of the cover to force the cover against a shoulder 30 formed on the extension so as to provide a permanent fluid tight joint between the extension and cover. The bearing 27 is preferably secured in the aperture 26 in the same manner as the extension 29 is secured in the opening 28. The bearing 27 is provided with an axial threaded aperture which receives the screw 11.

It will be noted that the tubular extension 29 is of a length somewhat greater than the length of the tubular extension 18, and that the extensions form longitudinal passages which are arranged in parallel relation. The extension 29 is preferably provided with a shoulder 31 so as to provide a stop for the end of a section of the conduit or hose line 3 which is adapted to be snugly fitted over the outer end of the extension as shown in Figure 1. The manner of connecting the extensions to the hose or conduit will be described in detail subsequently.

The valve mechanism will now be described in detail. The valve element or control member 9 constituting a component of the mechanism may be constructed as desired but as herein illustrated is made oblong or generally rectangular in shape, relatively thin and normally flat. The element may be constructed from any material which is sufficiently sensitive for the purpose but beryllium copper gauged to a predetermined degree of flexibility or yieldability has proven satisfactory in commercial use. It will be noted that the valve element is of a length greater than the distance between diametrically opposed portions of the rest 23 so that end portions of the element will project outwardly beyond the said opposed portions as clearly shown in Figures 2, 5 and 6 of the drawing. In other words, the arrangement is preferably such that end portions of the valve element will overhang the rest 23 regardless of the rotative position of the valve element on the rest. Otherwise expressed, portions of the valve element are arranged on either side of a portion of the rest. The ends of the valve element are preferably rounded so as to conform generally to the curvature of the pressure member 10 and side wall 15 of the cup. Attention is directed to the fact that the width of the valve element is somewhat less than the diameter of the rest 23 so as to provide an opening or passage 32 of generally segmental form adjacent each side of the valve element through which fluid can freely circulate about the pressure member 10, as shown in Figure 3.

Attention is directed to the important fact that the circular form of the valve rest 23 provides a revolutionary construction and performance in that the valve element assumes, under pressures of the concentric raised portion of the pressure member 10 a position roughly describable as in the path of a curved line. In other words, the curvature of the valve element is in part in a lateral direction and in part in a longitudinal direction.

Such compound curvature provides for the valve element added capacity for resisting accumulating pressures developed by the flow of fluid through the system. The valve element maintains this resistance until a predetermined point of pressure has been reached. This point of pressure can be varied by an adjustment of manual screw 11 of the pressure of the coil spring 13 upon the pressure plate 10.

In order to avoid the necessity for dealing with the full values of the fluid flow above a critical pressure point a vent such as 33 of predetermined size may be provided in the valve element, preferably concentric with the passage in the extension 18. This vent serves also the purpose of preventing—at extremely high vacuum values, the substantial sealing of the vent through the passage. In other words, the provision of this vent makes it possible to use a lighter and more responsive construction than would be required were the vent omitted and the full force of extreme vacuum pressure applied to the surface of the valve element.

Figure 7:
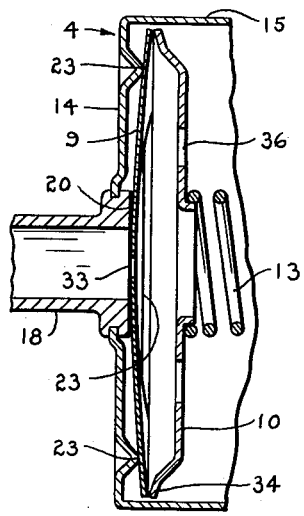
Figure 7 is an enlarged partial longitudinal section, similar to Figure 6 showing an operative position of the valve mechanism.

The pressure member 10 of the mechanism is preferably made in the form of a dished disc, having an annular offset flange 34. The diameter of the pressure member is somewhat greater than the diameter of the rest 23 and substantially corresponds to the length of the flexible valve element 9 so that the flange 34 will bear against the overhanging end portions of the valve element and distribute the pressure exerted by the spring. The pressure member 10 is also provided with a centrally disposed tubular portion 35 which extends in an axial direction toward the screw 11 and is received in one end of the helical spring 13. The dished or concave character of the member 10 not only imparts rigidity to the member to prevent distortion thereof but provides an arrangement whereby the flange 34 is the only part of the member which engages the valve element and at the same time affords clearance for movement of the element toward the screw 11 as shown in Figures 2, 6 and 7. The pressure member 10 is further preferably provided with a plurality of holes 36, four in number, arranged ninety degrees apart circumferentially about the tubular portion 35. The purpose of these holes is to allow fluid to freely circulate through the member. Some fluid may also circulate through the spring and tubular portion 35.

The spring retainer 12 may be made as desired but is preferably generally conical in shape and includes a cylindrical portion 37 and a flange 38. The opposite end of the helical spring 13 receives the cylindrical portion 37 and bears against the flange 38 to exert pressure in an axial direction to force member 10 against the valve element. The inner end of the screw is provided with a reduced portion 39 which is secured in a central aperture in the retainer by upsetting the end of the reduced portion as indicated at 40 in Figure 2 so that the retainer is loosely secured to the screw to permit the retainer to readily adjust itself with respect to the spring. With this arrangement, the spring 13 under strain serves to distribute and equalize the pressure of the pressure member against the overhanging end portions of the valve element and the pressure of valve element against the rest 23. The screw 11 is preferably provided with a knurled head 41 for manipulating the screw so that the force of the spring may be increased or decreased to meet various operating conditions. As shown in Figure 2 the spring pressure is such that the valve element is maintained in a slightly strained condition relative to the bearing surface or valve seat 20 on the flange 19.

Any means suitable for the purpose may be employed to lock the screw in place after it has once been adjusted. However, as herein illustrated, the locking is preferably accomplished by providing the knurled head 41 with a circumferential groove 42 to form a neck 43 so that the corresponding curved end portions 44 of the legs 45 of a hairpinlike wire clip will be received in the groove and resiliently embrace the neck as clearly illustrated in Figures 2 and 5. The clip is held in position by the groove and its substantially round bight end 46 resiliently embraces the longer tubular extension 29 as clearly shown. With this arrangement it will be obvious that the clip is prevented from turning about the extension and that its resilient legs afford sufficient clamping pressure against the neck 43 to automatically maintain the screw 11 in any position to which it may be adjusted.

In view of the foregoing description, it will be noted that substantially all of the parts employed are concentric—thus contributing to balance and accuracy in performance. Also, that, with the exception of the tubular members, the screws, and the springs, all of the parts can be produced readily on automatic or semi-automatic punch presses—thus providing maximum economy in production.

Simplicity of installation is made possible by the small weight of the device—which in turn is made possible by the hereindescribed features which contribute to sensitivity in response to varying flows or pressures. The device requires no support other than that provided by the conduit or hose 3. It is only necessary to sever, at any convenient point, the rubber hose leading from the intake or vacuum source of the automobile engine to the vacuum wiper motor. The two extensions 18 and 29 are then pressed into the hose, forming a connection amply secured by friction. The extension 13 is inserted in that portion of the severed hose which leads to the intake of the automobile engine and the other and longer extension 29 is inserted in the remaining section of the hose so that the flow of air through the device is from the vacuum wiper motor to the automobile engine, as the vacuum is developed by the operation of the automobile engine.

The valve device, in production at the factory, is readily set to provide a snap-over or breaking point on the part of the control member satisfactory for use on all vacuum windshield wiper motors within a predetermined size or power category. Two models, differing only in the diameter of the vent hole 32, at present provide complete service coverage for all vacuum wiper motors now in use. It is seldom necessary for the car owner to make any change in this adjustment. If he desires he may do so readily by the use of the manual screw 11, by which greater or less pressure may be applied to the control member through the pressure plate as mentioned above. Thus individual preferences as to windshield wiper motor speeds may be accommodated quite readily. Once set, the device does not change its adjustment or its performance appreciably but remains substantially stable. These devices are set at the factory usually to cause the valve element to snap over at about twelve to fifteen inches of vacuum.

In view of the foregoing it will be manifest that when the device is installed as in Figure 1 and the various components of the device are set as illustrated in Figure 2, a predetermined volume of fluid can circulate through the device in accordance with a predetermined pressure, without substantially altering the relative position of valve element 9. As the pressure or vacuum increases, the snap-over point is reached and the valve element 9 tends thereafter to vary its position in accordance with variations in such pressures as is shown by example by the dotted lines in Figure 6. These variations in position may occur at any point within the operating range of the movement of the valve element. As the vacuum increases, the pressure differential between the bottom of the valve element and the top increases so that the valve element is pressed closer to the valve seat 20. In normal operation the variations in the position of the valve element 9 (as occurring after the snapover) cover a range limited at one extreme at a point somewhat less than a complete sealing of the valve element 9 against the valve seat 20 and the position of the valve element shown in Figure 2. It is obvious that, with due allowance for frictional lag, valve element 9 will reset itself in the position shown in Figure 2 at the time the vacuum declines to the value predetermined by the setting of the screw 11.

The valve element 9, being fulcrumed on a circular rest 23 and receiving its pressures from a circular pressure member 10, forms itself, in the vacuum range below the predetermined setting, into a dished shape, which dished shape may be somewhat irregular. This dished shape, plus frictional resistance at points of contact between the valve element 9 and the rest 23 and pressure member 10, establishes a reluctance which fixes, along with the dishing of the valving element, a vacuum value which, within substantially narrow ranges, must be created to overcome the static of the frictional resistance and the dishing of the valve element to produce the snap-over.

Furthermore, once this valve element snaps, at a predetermined point of pressure, to its reversed lower position, it provides a restriction of the passage of air into the extension 18 and to the vacuum supply or intake manifold of the automobile engine. From this point on, the valve element, in its reversed position, responds to variations in fluid pressures so that as the pressure increases the distance between the valve element and the extension becomes shorter and the flow is correspondingly restricted—the result being that the actual volume of flow of air through the windshield wiper motor is held substantially constant so that the speed of the motor is held also substantially constant regardless of any change in vacuum values above the predetermined critical point at which the valve element snaps over to said reverse position.

Figure 8:
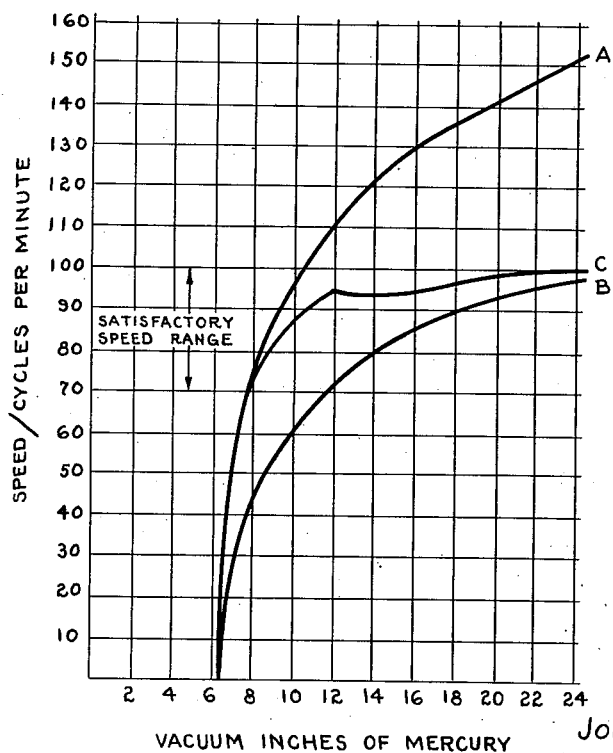
Figure 8 illustrates a performance chart showing various operative conditions which obtain with and without utilizing the invention.

Figure 8 shows a performance chart taken on August 30, 1951, with an ANCO Model MV-1 vacuum windshield wiper motor. Curve A shows vertically the cycles performed by the windshield wiper blade at varying vacuum pressures shown horizontally—with the throttle of the vacuum wiper motor wide open at all times. The chart shows by this curve A that speeds become excessive at vacuum value of ten inches and become destructive at a vacuum value of twenty-four inches.

Curve B shows performance with the throttle of the same vacuum wiper motor, operating under the same condition, restricted to minimize top speed and bring it within tolerable ranges. The throttle of the wiper motor was not changed during the production of either curve A or curve B. In producing curve A that throttle was wide open. In producing curve B it was partially closed to limit top speed. In the production of curve A and curve B the vacuum conduits were conventional and there was no introduction of the subject invention.

Curve C shows the performance of the same wiper motor, operating under the same conditions, with the subject invention introduced as herein contemplated, with the vacuum wiper motor operating at all times with its throttle wide open, as in the production of curve A, and with screw 11 adjusted to cause the snap-over of valve element 9 at approximately twelve inches of vacuum. Curve C shows performance under these described conditions as compared with performance under the conditions described to produce curves A and B, respectively.

It will be noted that, due to the minimizing of restrictions to the flow of air with valve member 9 in the position shown in Figure 2, performance follows curve A substantially exactly until the wiper blade speed closely approaches seventy cycles. At this point the static friction of the contacts above described begins to yield and the resistance of the dished valve member begins to yield. At a wiper blade speed of approximately 96 cycles the snap-over occurs and the substantially unrestricted regulatory function of valve element 9 comes into play as shown in Figure 6. It will be noted that this regulation holds the speed close to straight-line performance, even up to an abnormal vacuum pressure of twenty-four inches.

It will be noted that the invention, as shown in curve C has performed successfully its intended function of preventing wiper blade speeds beyond a satisfactory speed range. It will also be noted that between the point of slightly more than six inches of vacuum at which the internal friction of the motor and the friction of the load combined causes, under all conditions, a stalling of the motor, and the point of performance at twenty-four inches of vacuum, there lies between curve B and curve C a very substantial area which measures a plusage of actual performance of the wiper motor gained through the use of the subject invention. This invention has prevented excessive wiper blade speeds and, in addition, has provided substantially more wiping performance, particularly desirable, from the stall point of vacuum to the snap-over vacuum value of twelve inches. The ANCO Model MV-1 motor used in this test is a standard type of motor produced by The Anderson Company, Gary, Indiana.

The opening 33 in the valve element 9 is of a size to permit, under conditions where the valve element substantially prevents the flow of fluid between the valve element 9 and seat 20, sufficient flow of fluid to maintain motor performance within practicable limits of speed when the vacuum value is excessively high. Such excessive value frequently occurs substantially instantaneously when the foot throttle or accelerator of the automobile engine is lifted abruptly so as to create a sudden closing of the automobile engine throttle so that the automobile engine intake is restricted suddenly, with the result that the engine, still operating at relatively high speed, produces an abnormally high vacuum in the intake. One condition under which this abnormal condition endures longest is when the automobile is traveling downgrade.

In any conventional device for regulating flow of fluid the regulatory function of the device begins at zero pressure and effects a retarding action from zero pressure to the maximum pressures encountered. Thus the curve produced shows consistent increment from zero pressure to and through the normal operating range. The application of such conventional flow regulator to conditions where the working apparatus to be regulated reaches a point of stall (as the value of the flow pressure declines) produces a result deficient to the extent of the gain in performance attained through the application of subject invention, as herein described.

Thus the presence, as an element of the subject invention, of the combination of the curved fulcrum and curved pressure plate and of the dishing of the valve element 9 introduces a performance function of high utility not attained in any known device for similar purposes.

This novel combination and function, as explained herein, makes an important contribution to windshield wiper performance and thereby to the reduction of driving hazards through improved driving vision.

Figure 9:
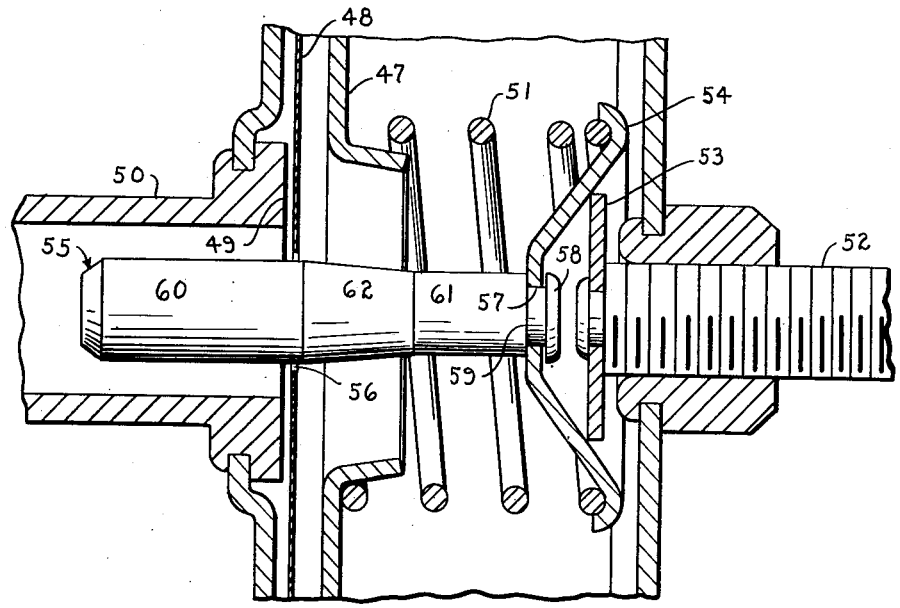
Figure 9 is an enlarged longitudinal sectional view taken through a modified form of valve device embodying the invention, showing the operative positions of certain components.
Figure 10:
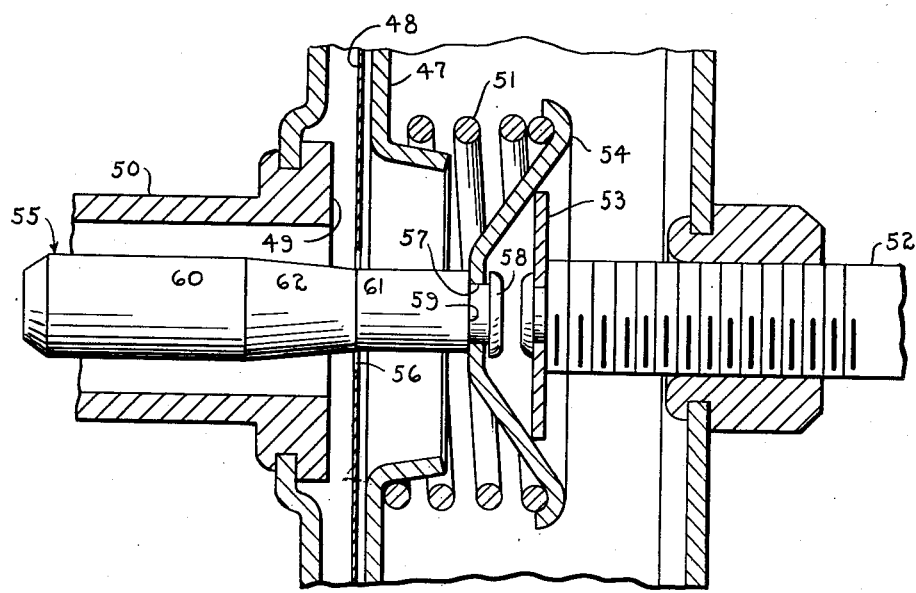
Figure 10 is a view similar to Figure 9 showing different operative positions of certain components.

A modified form of the invention is exemplified in Figures 9 and 10 of the drawing. This form offers an advantage over the one described above, by affording a setup whereby one valve device may be utilized to regulate the operation of wiper motors of practically any size or capacity now in use on various vehicles.

The construction illustrated in Figures 9 and 10 includes, among other things, a housing forming a chamber 10 within which is disposed a pressure member 47, a flexible valve element or diaphragm 48 movable relative to a seat 49 provided on a tubular extension 50, a helical spring 51, a manual adjustment preferably in the form of a screw 52, a round disc 53 fixed on the inner end of the screw and seated in a spring retainer 54, and a valve member generally designated 55 carried by the retainer 54 and extending through the pressure member, an aperture 56 provided in the flexible valve element 48 and into the tubular extension. It will be noted that except for the disc 53, and the valve member 55 and the size of the aperture 56 in the valve element 48, all of the other components substantially correspond to those similarly named and described in connection with the first embodiment of the invention.

More particularly, the inner end of the valve member 55 is preferably loosely secured to the base wall of the retainer 54 by providing the member with a neck portion which extends through a hole 57 in the wall and is upset to form a flange as indicated at 58. This flange is spaced axially from a shoulder 59 on the valve member, the space being slightly greater than the thickness of the base wall of the retainer and the diameter of the neck being slightly less than the diameter of the hole 57 so as to allow the valve member to sort of float and move through the aperture 56 without interfering with the normal functioning of the flexible valve element 48. In other words, the arrangement is such that the valve member 55 will not bind or stick on the flexible valve element.

The disc 53 which nests in the spring retainer 54 is rigidly secured to the screw 52 and is of a diameter to engage the inner conical surface of the retainer at a predetermined location to prevent the inner end of the screw or disc from engaging the inner end of the valve member 55. With this arrangement, the valve member 55 is freely movable, within practicable limits, and the coaction between the retainer 54, disc 53 and spring 51 serves to locate the retainer so that the valve member will be disposed substantially on the longitudinal axis of the device.

The valve member 55 is stem-like in character and preferably provided with stepped or graduated portions. More specifically, this valve member includes a cylindrical portion 60 of uniform diameter at the outer extremity, a cylindrical portion 61 of a smaller uniform diameter at its inner extremity, and an intermediate tapered cylindrical portion 62. By manipulating the screw 52, either of these cylindrical portions may be selectively disposed in the aperture 56 of the valve element 48 to control the flow of fluid through the aperture.

In view of the foregoing, it will be manifest that when the screw is manipulated to place the larger cylindrical portion 60 of the valve member 55 in the aperture 56 as shown in Figure 9, less fluid will pass through the aperture than when the reduced portion 61 is positioned in the aperture as shown in Figure 10. The amount of fluid that can flow through the aperture when the different portions 60, 61 and 62 of the valve member are located in the aperture is predetermined to meet the requirements of wiper motors of different sizes or capacities. More specifically, when the large cylindrical portion 60 of the valve member is disposed in the aperture 56, a sufficient flow of fluid is available for smaller motors and when the smaller cylindrical portion 61 is located in the aperture as shown in Figure 10, an increased flow of fluid is permitted to pass through the aperture to assist in the control of larger motors. It will also be evident that by manipulating the screw 52, the tapered portion 62 of the valve member can be located in different positions in the aperture to vary the flow whereby to assist in the control of intermediate sized motors having variable capacities.

The flexible valve element or diaphragm 48 is free to "snap over" and reduce the flow around the element into the tubular extension in the same manner as described above in connection with the first embodiment whenever the vacuum is sufficient to overcome the force exerted by the pressure member 47 through the spring 51.

In other words, the valve element is freely operable irrespective of the positions of the portions 60, 61 and 62 of the valve member in the aperture 56.

The embodiment of the invention exemplified in Figures 9 and 10 is, among other things, unique in that the flow of fluid through the aperture 56 and the flow about the diaphragm and through the extension can be simultaneously regulated by the manipulation of a single member preferably in the form of a screw. In other words, the screw serves to simultaneously place the valve element 48 and the valve member 55 in different respective operative positions to jointly control the flow of fluid through the valve device. The screw of course serves to vary the tension of the helical spring 51 for the purpose explained above.

Another attribute of the invention resides in an arrangement whereby two valve members, one movable in the other, jointly function to control the flow of a fluid through the device.

Although the above forms of the invention have been shown and described in detail, it will be apparent to those skilled in the art that the invention is not limited to the exact disclosures, but that various changes can be made therein without departing from the spirit of the invention of from the scope of the invention defined in the appended claims.

I claim:

1. A regulating and governing valve structure for fluid pressure differential power applications comprising a housing having a chamber provided with entrance and exit passages, an elongated resiliently flexible valve element movable in said valve chamber in response to fluid pressure differential variations and positioned between and partially obstructing the fluid flow between said passages, a seat for said valve element, said valve element having a bypass opening accommodating fluid flow, means in the chamber independent of fluid pressure exerting pressure against the ends of the element tending to maintain the element away from the seat, a valve member operatively associated with the valve element for regulating the flow of fluid through the opening, and means for manually adjusting the pressure means and the valve member.

2. A fluid control valve including a housing having a chamber and provided with tubular extensions communicating with the chamber and providing ingress and egress means whereby the valve may be communicatively connected with and supported by a conduit, a valve seat and a resiliently flexible valve element in the chamber operatively interposed between said tubular extensions, an opening in the valve element, rest means in the chamber disposed about the seat, said element being automatically movable within the chamber to inhibit or accommodate fluid flow through the chamber in accordance with variations in fluid pressure, pressure distributing means operable independently of fluid pressure forcing the element against the rest means, said rest means cooperating with said pressure distributing means to resist seat-engaging movement of the element when the fluid pressure falls below a predetermined value, and a manually adjustable valve member structurally related to the valve element for controlling the flow of fluid through the opening in the valve element.

3. A fluid control valve comprising a housing having openings therein providing for the ingress and egress of fluid to the housing, means for communicatively connecting the openings to conduits, a valve seat in said housing operatively associated with the egress opening, a resiliently flexible valve element in said housing, the valve element having an opening, a rest serving to normally maintain the element spaced from the seat, means biasing the element against the rest, the arrangement being such that a predetermined differential pressure between said openings will cause the element to flex into engagement with the seat so that fluid will flow only through said element opening, and a valve member disposed in the opening of the valve element for controlling the flow of fluid therethrough.

4. A fluid control valve device comprising a housing having a base wall and opposed end wall, an opening in the base wall a valve seat carried by the base wall and located within the housing at the opening, rest means supported on the base wall and surrounding said seat, a resiliently flexible valve element supported at spaced points on said rest means and permitting fluid to pass between said valve element and the remainder of said rest means, a hole in said element, spring pressed means maintaining the element against the rest means, an aperture in the end wall of the housing, the arrangement being such that a predetermined differential pressure between the opening and the aperture will cause the element to flex and engage the seat so that fluid will flow only through said hole in the element, and a valve member cooperable with said hole and movable with respect thereto for regulating the flow of fluid through said hole.

5. A fluid control device comprising a housing having ingress and egress openings, a valve seat associated with the egress opening, rest means, a resiliently flexible valve element cooperable with said valve seat to restrict the flow of fluid therethrough and supported on said rest means normally to prevent element-seat engagement, said element having an aperture, biasing means urging said valve element against said rest means, the arrangement being such that a predetermined differential pressure between said openings causes the element to flex and engage the seat so that fluid will flow only through said element aperture, and an additional valve element cooperable with said aperture for regulating the flow of fluid therethrough.

6. A fluid control valve comprising a housing having opposed walls, a valve seat connected to one of the walls and provided with an opening, a resiliently flexible valve element responsive to fluid pressure differentials arranged in the housing for engagement with the seat, a port provided in the element, rest means supporting the element off the seat, a pressure member, holes in the member through which fluid may circulate, adjustable spring means pressing the member against the element and the latter against the rest means, said element and said rest means being constructed and arranged whereby fluid may circulate through the holes and between the rest means and element and into the opening when the fluid pressure differential is low and when the pressure differential is high the element will be caused to flex and engage the seat to substantially prevent circulation of fluid into the opening, an aperture provided in the other of the opposing walls of the housing, and a valve member structurally related to the port in the valve element for controlling the flow of fluid through the port in the valve element.

7. A fluid control regulating valve comprising a walled chamber, a rest on one wall of the chamber, a first aperture in said one wall, a valve seat adjacent said aperture, a resiliently flexible valve element responsive to fluid pressure differentials engaging the rest to normally maintain the element spaced from the seat, an opening in the valve element to permit flow of fluid through the valve element, a pressure plate and resilient pressure means pressing the pressure plate against the valve element and the latter against the rest, a second aperture provided in another chamber wall, said element being movable toward the seat when the pressure is high in the chamber to reduce the flow of fluid therethrough, and a valve member movable in the opening of the valve element, for controlling the flow of fluid therethrough.

8. A fluid control valve comprising a cylindrical housing having substantially parallel end walls, holes provided in the end walls for communication with a conduit, a valve seat provided adjacent the hole in one of the end walls, an annular rest arranged about the seat and spaced axially therefrom, a resiliently flexible valve element responsive to fluid pressure differentials, said valve element being of a length greater than the diameter of the rest so that the ends of the element will extend outwardly from the rest, a round pressure distributing member, said distributing member having a peripheral portion of a diameter greater than that of the rest, a spring exerting axial pressure on the central area of the distributing member to cause the peripheral portion to act on the ends of the element to force the element against the rest at substantially diametrically disposed locations, said element being of a width less than the diameter of the rest to provide a pair of openings substantially segmental in shape through which fluid may circulate, an aperture provided in the center of the element through which fluid may circulate, the arrangement being such that an increase in fluid pressure differential between the holes will cause the element to move toward the seat and restrict in some measure the flow of fluid through the openings while allowing the fluid to pass through the aperture and an excessive increase in pressure differential will cause the element to engage the seat and permit the fluid to pass only through said aperture, and a manually operable valve member for controlling the flow of fluid through the aperture.

9. A fluid control valve comprising a housing forming a chamber and provided with openings for communicative connection with a conduit, a rest means having portions disposed on opposite sides of one of the openings, a valve seat surrounding said one opening, a thin resiliently flexible valve element held against said rest means so that a central portion of the element may automatically move in accordance with variations in fluid pressure differentials to engage and disengage the valve seat to control the flow of fluid through said one opening, an aperture provided in the valve element, and a valve member extending through the aperture for regulating the flow therethrough, said valve member having different longitudinally extending portions of variable cross-sectional dimensions for selective disposition in the aperture to obtain such regulation.

10. A fluid control valve comprising a housing having opposed end walls and forming a chamber, tubular fittings extending from the end walls and communicatively connected with the chamber, one of said fittings being formed to provide a valve seat, annular abutment means surrounding the seat, a resiliently flexible valve element responsive to fluid pressure differentials engaging the abutment means at spaced points to locate the element in spaced relation to the seat, an aperture provided in the valve element, the arrangement being such that the element will flex relative to the valve seat in accordance with variations in pressure differentials between the fittings to control the flow of fluid through the chamber, and means structurally related to the aperture in the valve element for controlling the flow of fluid through the aperture in the valve element.

11. A fluid control valve comprising a housing forming a chamber and having opposed end walls provided with openings, a valve seat at one opening, a resiliently flexible valve element responsive to fluid pressure differentials supported for movement with respect to said seat, an aperture provided in the valve element, said valve element being so formed that fluid can freely flow through the chamber and said openings and when the pressure differential is below a predetermined value the element will flex relative to said seat and reduce the flow of fluid through said one opening, a valve member disposed in said aperture for controlling the flow of fluid therethrough, and manually operated means whereby the valve element and the valve member can be simultaneously moved to predetermined positions.

12. A valve device comprising a housing having opposed walls, one of said walls being provided with a tubular extension having a valve seat provided adjacent its inner end, a resiliently flexible valve element responsive to fluid pressure differentials supported on said one wall in spaced relation with respect to said seat, an opening provided in said valve element, a pressure member engaging said valve element, an aperture provided in said pressure member, a cup-like member arranged in the housing, a helical spring interposed between the pressure member and cup-like member for urging the members in opposite directions, an internally threaded bearing secured to the other wall of the housing in axial alignment with said tubular extension, a screw carried by the bearing, the inner end of said screw being provided with means nesting in the cup-like member, an elongated valve member loosely connected to said cup-like member and extending through the aperture in the pressure member and the opening in the valve element and into the tubular extension, said screw member being movable to simultaneously adjust the tension of the spring to force the pressure member against the valve element and position the valve element with respect to the valve seat so that the valve element may flex relative to the seat in accordance with the variations in fluid pressure differentials and at the same time predetermine the position of the valve member in the opening of the valve element for controlling the flow of fluid through said opening irrespective of any position of the valve element.

13. A valve device comprising a housing provided with an aperture and a tubular extension forming a passage for fluid, a valve seat provided in said housing adjacent said tubular extension, a resiliently flexible valve element movable relative to the valve seat in accordance with variations in fluid pressure differentials obtaining in the housing, an opening provided in said valve element, a valve member disposed in said opening and in the tubular extension, said valve member being provided with regular cylindrical portions of different diameters and an intermediate tapered cylindrical portion, means for locating the valve element in a predetermined position with respect to the valve seat, and means for locating any one of the cylindrical portions of the valve member in the opening for controlling the flow of fluid through said opening.

References Cited in the file of this patent

UNITED STATES PATENTS

| | | |
|---|---|---|
| 543,448 | Lowe | July 23, 1895 |
| 1,380,787 | Ellmauer | June 7, 1921 |
| 1,681,911 | Spencer | Aug. 21, 1928 |
| 1,897,155 | Vaughn | Feb. 14, 1933 |
| 1,990,747 | Netschert | Feb. 12, 1935 |
| 2,128,878 | Horton | Aug. 30, 1938 |
| 2,133,575 | Rosenberg | Oct. 18, 1938 |
| 2,165,995 | Canetta | July 11, 1939 |
| 2,291,881 | Coffey | Aug. 4, 1942 |
| 2,608,352 | Schuster | Aug. 26, 1952 |
| 2,610,063 | Faucheux | Sept. 9, 1952 |

FOREIGN PATENTS

| | | |
|---|---|---|
| 107,058 | Great Britain | June 14, 1917 |